United States Patent
Heinemann et al.

(10) Patent No.: US 7,432,490 B2
(45) Date of Patent: Oct. 7, 2008

(54) METHOD AND APPARATUS FOR DETECTING AN OBJECT IN A MOTOR VEHICLE ENVIRONMENT

(75) Inventors: Patrick Heinemann, Winningen (DE);
Alexander Schanz, Stuttgart (DE);
Andreas Spieker, Stuttgart (DE)

(73) Assignee: Daimler AG, Stuttgart (DE)

( * ) Notice: Subject to any disclaimer, the term of this patent is extended or adjusted under 35 U.S.C. 154(b) by 56 days.

(21) Appl. No.: 10/550,057

(22) PCT Filed: Jan. 30, 2004

(86) PCT No.: PCT/EP2004/000844

§ 371 (c)(1),
(2), (4) Date: Mar. 6, 2007

(87) PCT Pub. No.: WO2004/083892

PCT Pub. Date: Sep. 30, 2004

(65) Prior Publication Data

US 2007/0252075 A1   Nov. 1, 2007

(30) Foreign Application Priority Data

Mar. 21, 2003  (DE) ............................ 103 12 611

(51) Int. Cl.
*G01S 17/93* (2006.01)
*H01J 40/14* (2006.01)

(52) U.S. Cl. .................... 250/206.1; 356/5.01
(58) Field of Classification Search ............ 250/206.1, 250/206.2; 702/150, 151, 152, 159; 356/5.01
See application file for complete search history.

(56) References Cited

U.S. PATENT DOCUMENTS

| | | | |
|---|---|---|---|
| 2002/0059042 A1 | 5/2002 | Kacyra et al. | |
| 2006/0091286 A1* | 5/2006 | Finizio et al. | 250/206.1 |
| 2007/0252075 A1* | 11/2007 | Heinemann et al. | 250/215 |

FOREIGN PATENT DOCUMENTS

| | | |
|---|---|---|
| DE | 195 03 960 A1 | 8/1995 |
| DE | 101 16 277 A1 | 10/2002 |
| EP | 1 267 177 A1 | 12/2002 |
| WO | WO 01/88566 A2 | 11/2001 |

* cited by examiner

*Primary Examiner*—John R Lee
(74) *Attorney, Agent, or Firm*—Crowell & Moring LLP

(57) ABSTRACT

A method for detecting an object in a motor vehicle environment uses a detection means which scans the environment at predetermined angular increments $\phi i +- \phi i$ (i=1,2, ..., N). When sensing a reflection signal of the object at an angle $\phi i$, the angular increments are refined in the angular range between the adjacent angles $\phi i-1$ and $\phi i+1$ as a function of signal propagation times $t i-1$, $t i$ and $t i+1$ of the reflection signals sensed at the angles $\phi i-1$, $\phi i$ and $\phi i+1$.

14 Claims, 1 Drawing Sheet

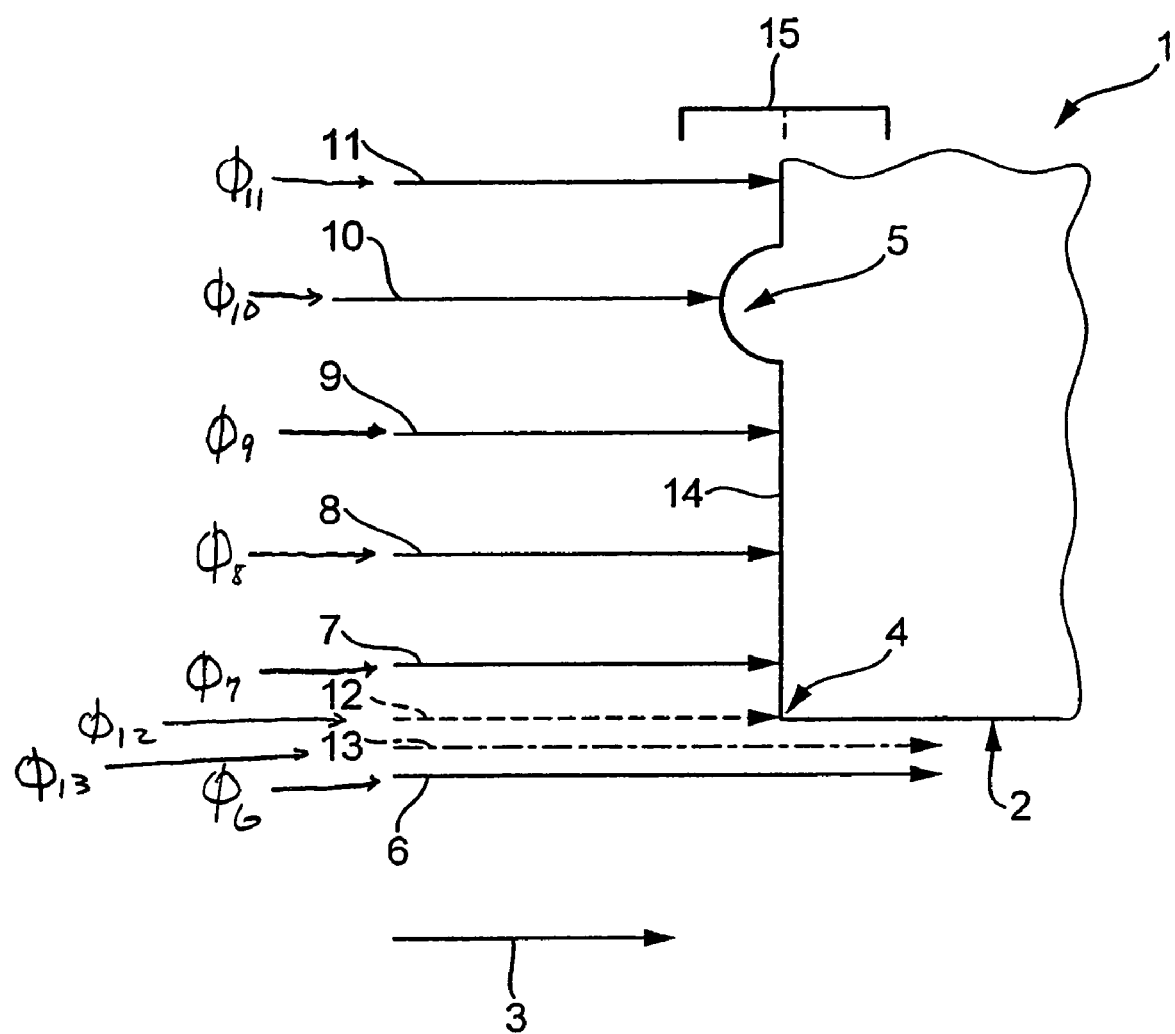

METHOD AND APPARATUS FOR DETECTING AN OBJECT IN A MOTOR VEHICLE ENVIRONMENT

BACKGROUND AND SUMMARY OF THE INVENTION

This application claims the priority of German patent document 103 12 611.2, filed Mar. 21, 2003 (PCT International Application No. PCT/EP2004/000844, filed Jan. 30, 2004), the disclosure of which is expressly incorporated by reference herein.

The invention relates to a method and apparatus for detecting an object in a detection field such as a motor vehicle detection field, by scanning the environment at predetermined angular increments.

German patent document DE 101 16 277 A1 discloses a device for detecting objects during operation of a motor vehicle, using a scanning detection means (in particular, a laser). Objects moving in relation to the vehicle are classified as regards their size, degree of reflection, speed and acceleration. The object is then identified (for example as a passenger vehicle, an HGV, a motorcycle, a bicycle or a pedestrian) using a subcombination of these evaluation variables.

German patent document DE 195 03 960 A1 also describes an object detection device for vehicles having a laser for emitting light and a device for receiving the light reflected by an object (laser scanner). The pulsed laser scans an environment using a predetermined number of increments, (for example 100), and the distance and speed of the object are determined in computing devices.

An obstacle identification device identifies the detected object on the basis of a distribution pattern of the light intensity received.

One disadvantage of the known radar devices is that the resolution of the laser scanners used is in many applications insufficient in the operating mode to be able to determine reliably the extent of an object to be detected.

One object of the present invention is to provide an improved method and apparatus for detecting an object in a motor vehicle environment, using a detection to scan the environment at predetermined angular increments.

This and other objects and advantages are achieved by the method and apparatus according to the invention, in which a reflection signal of an object is sensed at angles $\phi i$ (i=1, 2, ..., N). According to the invention, the angular increments are refined in the angular range between adjacent angles $\phi i-1$ and $\phi i+1$, as a function of the signal propagation times $ti-1$, $ti$ and $ti+1$ of the reflection signals sensed at the angles $\phi i-1$, $\phi i$ and $\phi i+1$. In order to detect the object in a motor vehicle environment, a detection unit is used which scans the environment at predetermined angular increments $\phi i+1-\phi i$. For many assisting and safety functions in the vehicle, knowledge of the precise dimensions of the objects located in the environment is indispensable. The method according to the invention ensures highly accurate determination of the dimensions of an object, (for example of a road user such as a vehicle), so that it is possible, for example, to assign it reliably to classes such as a pedestrian, bicycle, passenger car and HGV. Each of these classes is characterized by a specific acceleration behavior and movement pattern in the road traffic, so that a targeted and safe response to a current traffic situation is possible.

In one embodiment of the invention, if the absolute propagation time difference between the signal propagation times $ti$ and $ti-1$ or $ti$ and $ti+1$ (corresponding to sensing angles $\phi i-1$, $\phi i$ and $\phi i+1$ of the reflection signals) exceeds a predetermined threshold value, at least one additional angle $\phi z$ (z=1, 2, ..., N) is sensed in the angular range between the angles $\phi i-1$ and $\phi i$ or $\phi i$ and $\phi i+1$. The predetermined threshold value for the absolute propagation time difference, it should be noted, is selected such that distinctive object features (for example lamps or a radiator grille in a vehicle) lead to measurable propagation time differences between adjacent reflection signals which lie below the predetermined threshold value for the absolute propagation time difference. Absolute propagation time differences between the signal propagation times $ti$ and $ti-1$ or $ti$ and $ti+1$ of adjacent reflection signals which exceed the predetermined threshold value, on the other hand, are a clear indication of obvious geometrical changes which can be associated, in particular, with object boundaries (for example the front, right-hand corner of the vehicle). The introduction of the additional angle $\phi z$ to be sensed in the angular range between the angles $\phi i-1$ and $\phi i$ or $\phi i$ and $\phi i+1$ makes it possible for object boundaries to be determined substantially more accurately. The method, namely the introduction of further angles $\phi iz$ additionally to be sensed, is continued until reliable detection of the size and classification of the object is ensured.

It is advantageous if the scanning takes place substantially horizontally, vertically and/or at a predetermined angle of inclination. With scanning which is carried out vertically or at a predetermined angle of inclination, the presence and the position of a curb can be detected. This prevents the vehicle from driving onto the curb or ensures that it does so in a manner which is not damaging to the tires. The position and alignment of the curb can also be used for the selection of a desired vehicle position in a parking space. In addition, the knowledge of the position of a curb can be used to find vacant parking spaces which are not provided or delimited by two vehicles but lie in front of, behind or next to a single vehicle and are delimited on the other side by a curb.

Another feature of the invention provides a device for detecting an object in a motor vehicle environment. According to the invention, the device can be used to set individually the angles $\phi i$ to be scanned, so that a cost-effective sensor system is provided for detecting an object in a motor vehicle environment using one or a very limited number of measuring beams. The system is compact and can be positioned in many locations in the vehicle owing to its low installation depth.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a schematic plan view of a section of an object in a motor vehicle environment.

DETAILED DESCRIPTION OF THE INVENTION

An object 1 illustrated in section in the FIGURE is located in the environment of a motor vehicle (not illustrated in any more detail), and has detection means which scan the environment at predetermined angular increments to detect the object 1. The number of angular increments depends on the required resolution accuracy. The object 1 has a corner 4 and a bulge 5 in a surface profile 2. If the object 1 is a motor vehicle, the corner 4 could be, for example, a front, lateral boundary and the bulge 5 may be a headlamp. The object 1 may be a moving road user or road traffic devices having a fixed position. Moving road users are, for example, pedestrians, bicycles, passenger cars and HGVs. Devices having a fixed position are, in particular, street signs and road markings, for example curbs.

The scanning detection means comprises a sensor which indicates the distance, and it is possible to set individually the angles $\phi i$ (i=1, 2, 3 ... N) that are to be scanned. The spatially delimited measuring direction of the sensor is indicated by an arrow 3. Scanning takes place substantially horizontally in this application (i.e., parallel to a road surface). To facilitate an understanding of the exemplary embodiment, the emitted beam from the sensor associated with the reflection signal 6 to 13 is illustrated in the FIGURE, and represents also the reflection signal 6 to 13. For further simplification purposes, the reflection signals 6 to 13 which are detected at the angles $\phi 6$, $\phi 7$ to $\phi 13$ by scanning detection means are illustrated as parallel beams.

The reflection signals 7, 8, 9, 11 are reflected by a planar face 14, which faces the vehicle, of the surface profile 2 of the object 1. The planar face 14 of the object 1 takes up the majority of the view of the object 1 which faces the motor vehicle and can be detected by the laser of the motor vehicle.

In a method for detecting the object 1 in the motor vehicle environment, when sensing reflection signals 6 to 11 at the respective angles $\phi 6$ to $\phi 11$, the angular increments are refined in the angular range between adjacent angles $\phi 6$ to $\phi 11$ as a function of the signal propagation times t6 to t11 of the sensed reflection signals 6 to 11. If the absolute propagation time difference between the signal propagation times t6 to t11 of two adjacent reflection signals 6 to 11 exceeds a predetermined threshold value, at least one angle $\phi 12$, which is also to be sensed, is introduced in the angular range between these respectively adjacent reflection signals 6 to 11.

The predetermined threshold value for the absolute propagation time difference corresponds to a threshold value of the path difference for the reflection signals 6 to 13, because the reflection signals 6 to 13 all propagate at the speed of light. The path difference is shown in the FIGURE as the path difference window 15 in relation to the reflection signals 7, 8, 9 and 11. For a simplified illustration, the path difference window 15, which is of equal size for all of the reflection signals 6 to 13, has not been shown in the FIGURE for the reflection signals 6, 10, 12 and 13. The selected threshold value of the absolute propagation time difference and, correspondingly, the path difference window 15 is sufficiently large that, in the event of a deviation in the path difference between two adjacent reflection signals 6 to 13 which is greater than the path difference window 15, it can be assumed that the two reflection signals do not belong to the object 1.

The method will be described in detail below. In a first scanning run of the object 1 with the reflection signals 6 to 11, for example with scanning at constant angular increments, the object 1 is detected with the reflection signals 7 to 11. That is, the reflection signals 7 to 11 are reflected by the object 1 and detected by the scanning detection means of the motor vehicle, while the reflection signal 6 is not incident on the object 1 and passes to the side of it. With the first scanning run, the dimensions, in the case of horizontal scanning the width, of the object 1 are generally not detected accurately enough in order to be able to uniquely classify the object 1. A specific driving behavior of the motor vehicle as a response to the presence of the object 1 generally cannot be estimated or derived from the results of the first scan.

In order to detect the width of the object 1 more accurately, the signal propagation times t6 to t11 of the reflection signals 6 to 11 are evaluated for a second scanning run of the object 1. For each pair of directly adjacent reflection signals 6 to 11, the absolute propagation time difference of their signal propagation times t6 to t11 is calculated and compared with the predetermined threshold value for the absolute propagation time difference. The absolute propagation time difference of directly adjacent reflection signals 6 to 11 may be greater or less than the predetermined threshold value for the absolute propagation time difference. Correspondingly, it is true that the path difference of two directly adjacent reflection signals 6 to 11 lies within the corresponding path difference window 15 for an absolute propagation time difference less than the predetermined threshold value.

The adjacent reflection signals 6 and 7, however, have an absolute propagation time difference which is greater than the predetermined threshold value for the absolute propagation time difference. All other reflection signals 8 to 11 have an absolute propagation time difference (in relation to their respectively adjacent reflection signals 7 to 11) which is less than the prescribed threshold value for the absolute propagation time difference. By a suitable selection of the threshold value for the absolute propagation time difference, the bulge 5 is also recognized as being associated with the object 1.

For accurate determination of the lateral boundary of the object 1 in the region of the corner 4 during the second scanning run, at least one further reflection signal 12 (illustrated for distinguishing purposes as a dashed arrow) is generated at an angle $\phi 12$ in the angular range between the angles $\phi 6$ and $\phi 7$, at which the reflection signals 6 and 7 are received. The latter angular range is therefore scanned with a higher resolution during the second scanning run than during the first scanning run, in order to determine more accurately the boundary of the object 1. However, it is also possible for two or more such additional angles to be introduced and sensed in the angular range for the second scanning run.

The additional angle $\phi 12$ that is to be sensed can be determined in an interval nesting method, for example by halving the angular range between the angles $\phi 6$ and $\phi 7$, or in an iteration method with a suitable weighting. The reflection signal 12 is likewise reflected by the object 1 and defines the boundary of the object 1 much better than the reflection signal 7.

If the desired resolution for the width of the object 1 is still insufficient after the second scanning run, the method is continued. For each pair of directly adjacent reflection signals 6 to 12, in turn the absolute propagation time difference of their signal propagation times t6 to t12 is calculated and compared with the predetermined threshold value for the absolute propagation time difference. The reflection signals 6 and 12 have an absolute propagation time difference which is greater than the predetermined threshold value for the absolute propagation time difference. In a further scanning run, a reflection signal 13 (illustrated for distinguishing purposes as a dotted arrow) is therefore generated at an angle $\phi 13$ in the angular range between the reflection signals 6 and 12. The reflection signal 13 is not reflected by the object 1. The method for detecting the object 1 in the motor vehicle environment can be continued until reliable detection of the object 1 is ensured by sufficiently accurate determination of the dimensions.

While scanning is carried out horizontally in this exemplary embodiment, it may also be carried out vertically or at a predetermined angle of inclination. With vertical scanning, in addition to the height of the object 1, the presence and the height of curbs as the road boundary can also be detected. Curbs have two sharp edges (in each case one edge at the level of the road and at the level of the sidewalk) and a curb wall perpendicular to the road surface. As a result, curbs can be detected very effectively using the method according to the invention both in terms of their position and in terms of their height.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for detecting location of an object in a detection field, using a detection device that scans the detection field, said method comprising:
scanning the detection field at predetermined angular increments, and sensing corresponding reflection signals;
when sensing a reflection signal of the object at an angle $\phi I$ (I =1, 2, ... N), adjusting the angular increments refined in the angular range between the angles $\phi i-1$ and $\phi i+1$ as a function of signal propagation times $t i-1$, $ti$ and $ti+1$ of reflection signals sensed at the angles $\phi i-1$, $\phi i$ and $\phi i+1$.

2. The method as claimed in claim 1, wherein at least one additional angle $\phi z$ (z=1,2, ... , N) which is to be sensed is introduced into the angular range between the angles $\phi i-1$ and $\phi I$, or $\phi i$ and $\phi i+1$, if an absolute propagation time difference between the signal propagation times $ti$ and $ti-1$ or $ti$ and $ti+1$ of the reflection signals exceeds a predetermined threshold value.

3. The method as claimed in claim 2, wherein the method is continued until reliable detection of the object is ensured.

4. The method as claimed in claim 2, wherein the additional angle $\phi z$ is determined in an interval nesting method.

5. The method as claimed in claim 2, wherein the additional angle $\phi z$ is determined in an iteration method, with suitable weighting.

6. The method as claimed in claim 2, wherein scanning takes place substantially horizontally.

7. The method as claimed in claim 2, wherein scanning takes place substantially vertically.

8. The method as claimed in claim 2, wherein scanning takes place at a predetermined angle of inclination.

9. A device for detecting an object in a detection field for the purpose of carrying out the method as claimed in claim 1, wherein the angular increments can be set in the angular range between two angles $\phi i-1$ and $\phi i$ as a function of signal propagation times $ti-1$ and $ti$ of corresponding reflection signals sensed at the angles $\phi i-1$ and $\phi i$.

10. A method for detecting spatial location of an object within a detection field, said method comprising:
emitting scanning signals at predetermined sensing angles distributed across said detection field;
for each such scanning signal, sensing a corresponding reflection signal;
determining a propagation time for each reflection signal;
for each pair of adjacent reflection signals determining a propagation time difference;
for any such pair of adjacent reflection signals for which a determined propagation difference exceeds a predetermined threshold value, adjusting the sensing angle between scanning signals corresponding to such pair of adjacent reflecting signals, and repeating the preceding steps.

11. The method according to claim 10, wherein said adjusting step comprises introducing an additional scanning signal between such pair of adjacent reflection signals.

12. The method as claimed in claim 11, wherein the method is continued until reliable detection of the object is ensured.

13. The method as claimed in claim 11, wherein the orientation of the additional scanning signal is determined in an interval nesting method.

14. The method as claimed in claim 11, wherein the the orientation of the additional scanning signal is determined in an iteration method, with suitable weighting.

* * * * *